(12) United States Patent
Chen et al.

(10) Patent No.: US 11,516,757 B2
(45) Date of Patent: Nov. 29, 2022

(54) MULTI-ACCESS POINT COLLABORATION IN WIRELESS COMMUNICATIONS

(71) Applicant: Intel Corporation, Santa Clara, CA (US)

(72) Inventors: Cheng Chen, Portland, OR (US); Juan Fang, Hillsboro, OR (US); Po-Kai Huang, San Jose, CA (US); Laurent Cariou, Portland, OR (US); Carlos Cordeiro, Portland, OR (US); Jeffrey R. Foerster, Portland, OR (US); Dave A. Cavalcanti, Portland, OR (US); Roya Doostnejad, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 16/894,511

(22) Filed: Jun. 5, 2020

(65) Prior Publication Data

US 2020/0305103 A1     Sep. 24, 2020

Related U.S. Application Data

(60) Provisional application No. 62/858,468, filed on Jun. 7, 2019, provisional application No. 62/858,760, filed on Jun. 7, 2019.

(51) Int. Cl.
    *H04W 56/00* (2009.01)

(52) U.S. Cl.
    CPC .................. *H04W 56/001* (2013.01)

(58) Field of Classification Search
    CPC .................................. H04W 56/001
    See application file for complete search history.

(56) References Cited

U.S. PATENT DOCUMENTS

| | | | |
|---|---|---|---|
| 2016/0212702 A1* | 7/2016 | Ghosh | H04W 56/001 |
| 2018/0098330 A1* | 4/2018 | Nguyen | G06N 20/00 |

* cited by examiner

*Primary Examiner* — Kyaw Z Soez
(74) *Attorney, Agent, or Firm* — Schwegman Lundberg & Woessner, P.A.

(57) ABSTRACT

Systems, methods, and devices related to an EHT multi-AP group are described. The coordinated APs of the EHT group are synchronized to the coordinator AP using a periodic or non-periodic frame. Each coordinated AP then synchronizes STAs associated with the coordinated AP. In response to an MPDU, either triggered by a trigger frame from the coordinator AP or initiated by the STA, an ACK frame or NDP response is sent by each AP receiving the MPDU. The response to the MPDU is dependent on whether frame aggregation is used, as well as whether the trigger frame triggers transmission of MPDUs from multiple STAs.

20 Claims, 18 Drawing Sheets

MULTI-ACCESS POINT COLLABORATION IN WIRELESS COMMUNICATIONS

PRIORITY INFORMATION

This application claims the benefit of priority to U.S. Provisional Patent Application Ser. No. 62/858,468, filed Jun. 7, 2019 and U.S. Provisional Patent Application Ser. No. 62/858,760, filed Jun. 7, 2019, each of which is incorporated herein by reference in its entirety.

TECHNICAL FIELD

Embodiments pertain to wireless networks and wireless communications. Some embodiments relate to the use of multiple access points (APs) in wireless communications. Some embodiments relate to multi-AP time synchronization mechanisms for extreme high throughput (EHT).

BACKGROUND

The use of networks has increased due to both an increase in the types of wireless communication devices using resources as well as the amount of data and bandwidth being used by various applications, such as video streaming, operating on these devices. Wireless communication devices are increasingly requesting access to wireless channels. To this end, it is desirable to increase the network and spectrum availability to provide efficient use of the resources of a wireless local-area network (WLAN) to provide bandwidth and acceptable response times (EHT) to the users of the WLAN. To handle the increased use and improve efficiency, Institute of Electrical and Electronics Engineers (IEEE) 802.11 standards are being developed to utilize Orthogonal Frequency-Division Multiple Access (OFDMA) in channel allocation. Moreover, wireless communication devices may communicate over an increased variety of bandwidths, thus leading to the development and use of a variety of networks, such as a next generation 60 GHz (NG60) network and an enhanced directional multi-gigabit (EDMG) network.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
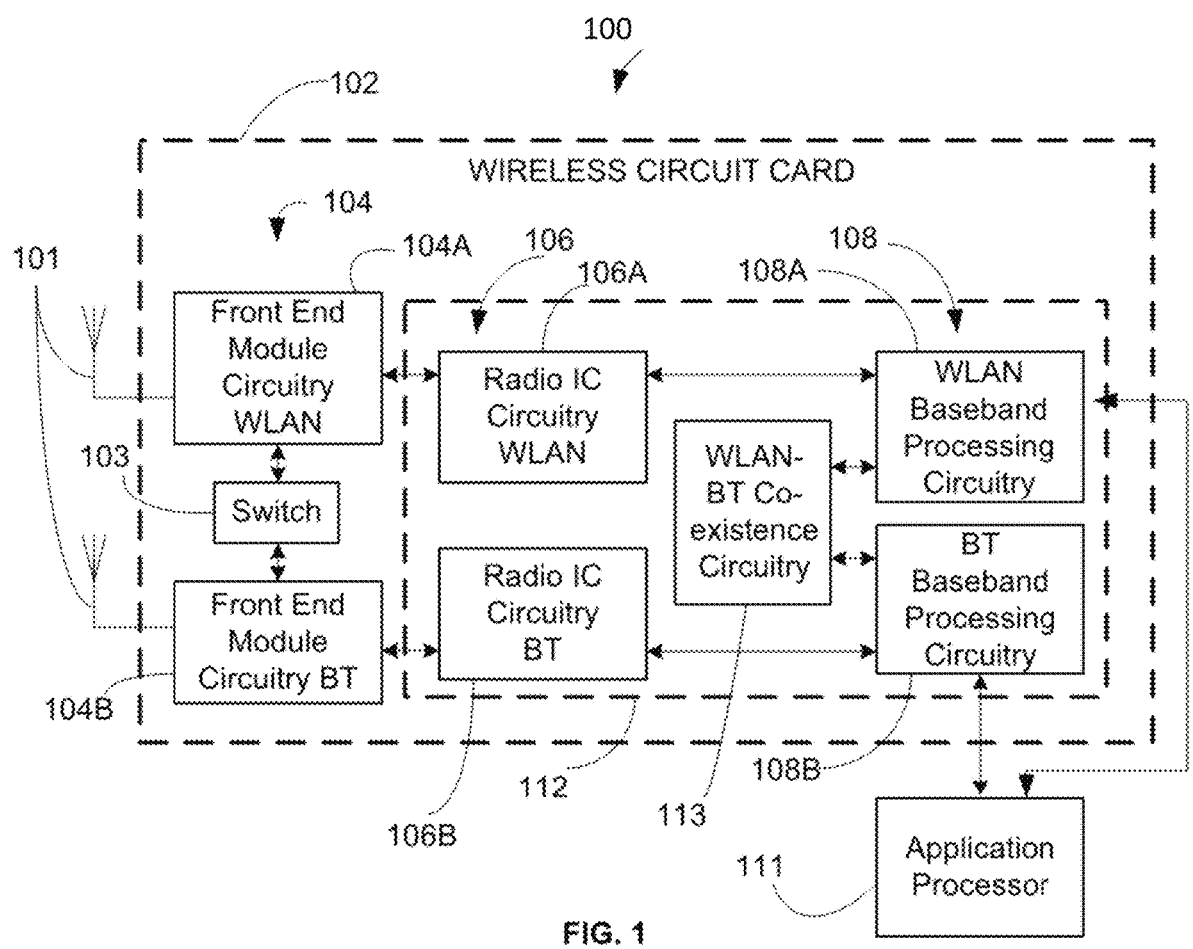
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards. The various IEEE 802.11 standards mentioned herein are incorporated by reference in their entirety.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
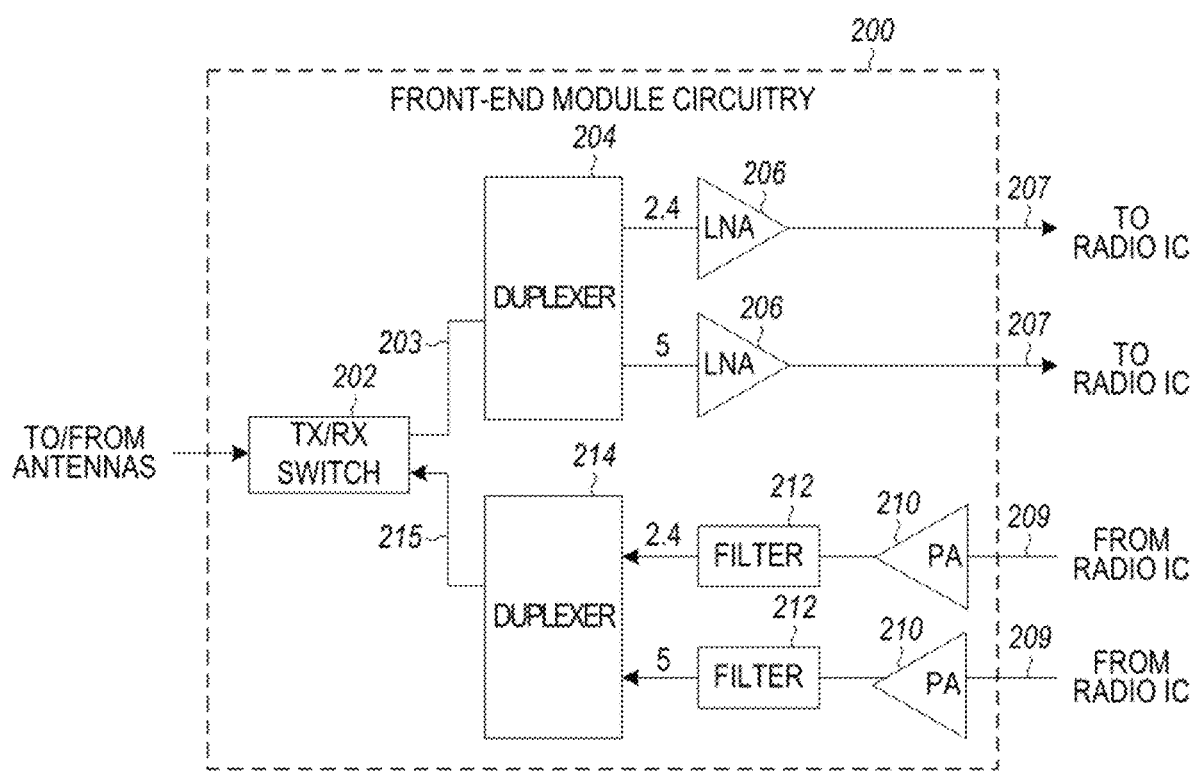
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
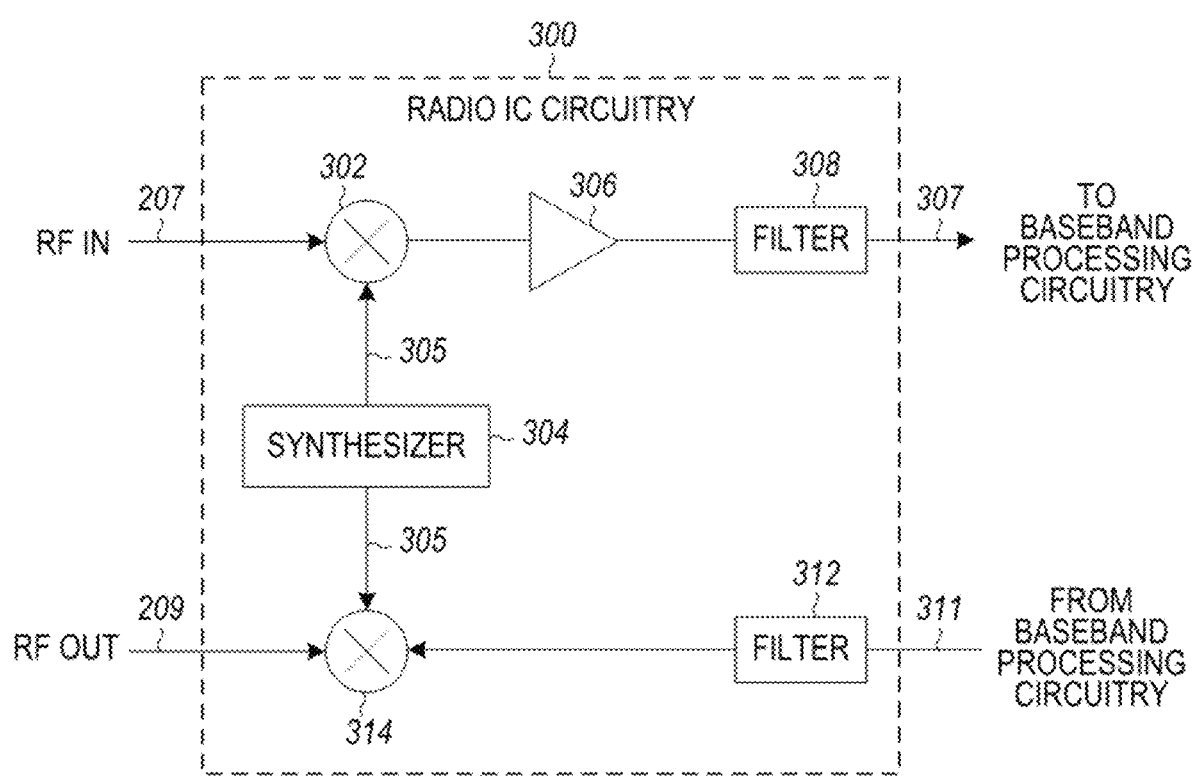
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
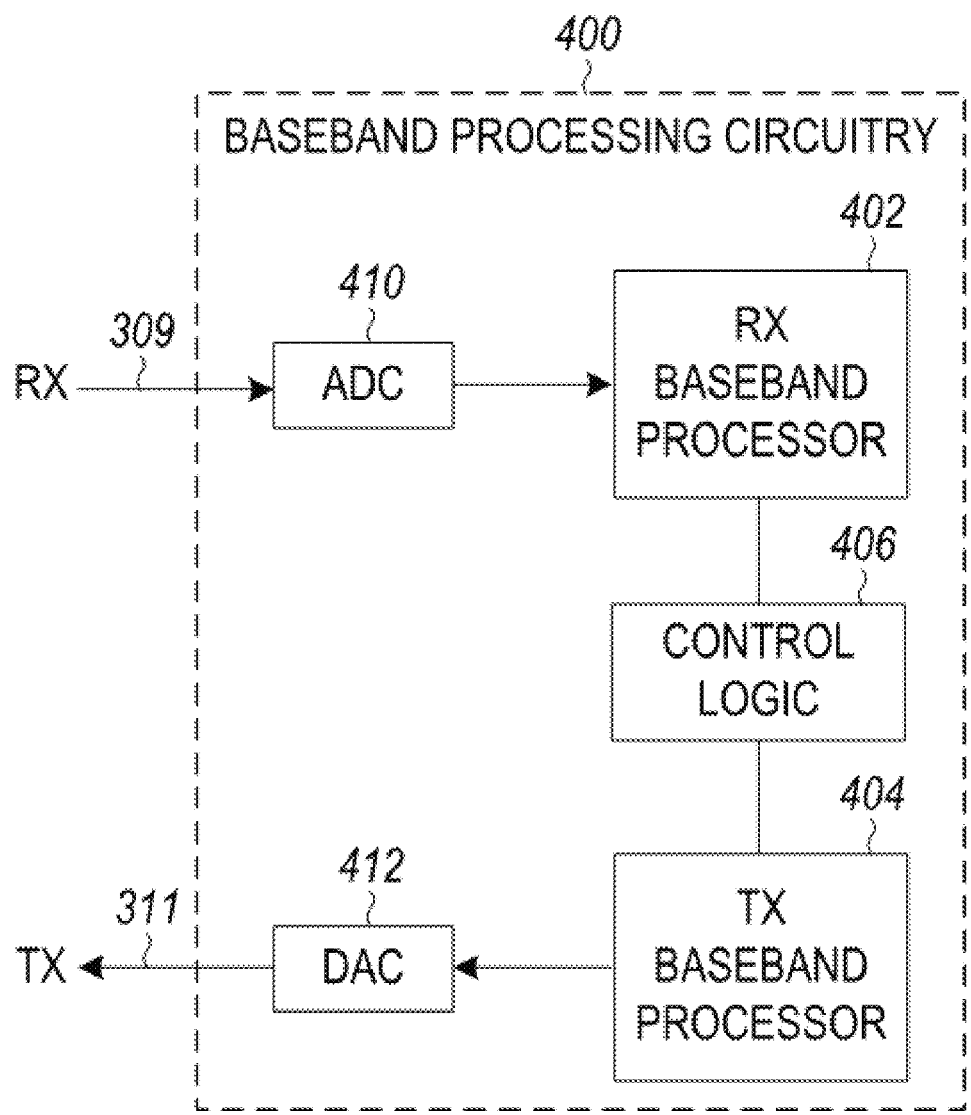
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
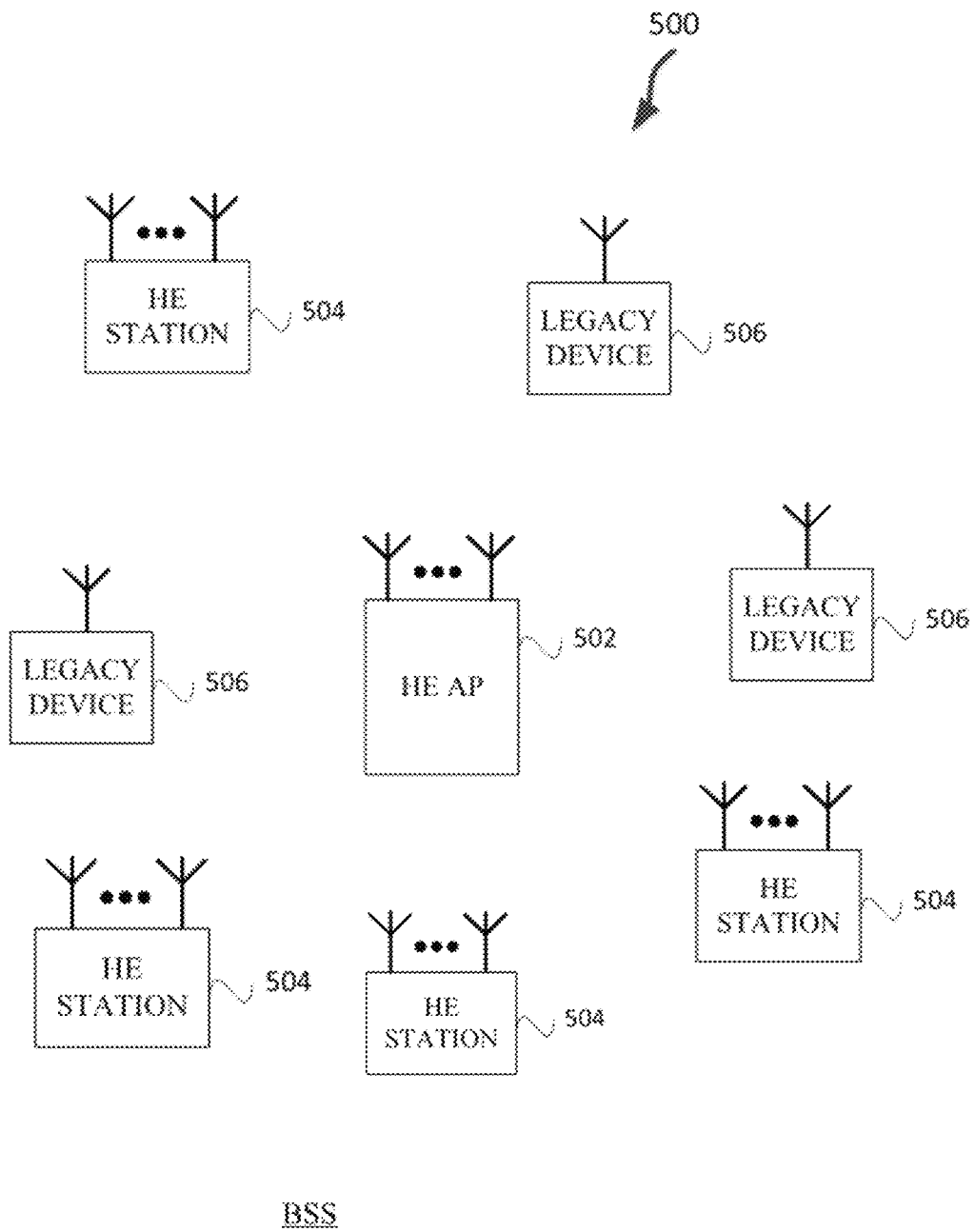
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephones, portable electronic wireless communication devices, smart telephones, handheld wireless devices, wireless glasses, wireless watches, wireless personal devices, tablets, or other devices that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a Trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502.

During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the Trigger frame may indicate an uplink (UL) UL-MU-MIMO and/or UL OFDMA TXOP. In some embodiments, the Trigger frame may include a DL UL-MU-MIMO and/or DL OFDMA with a schedule indicated in a preamble portion of Trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-17.

In example embodiments, the HE station 504 and/or the HE AP 502 are configured to perform the methods and operations/functions described herein in conjunction with FIGS. 1-17. In example embodiments, an apparatus of the HE station 504 and/or an apparatus of the HE AP 502 are configured to perform the methods and functions described herein in conjunction with FIGS. 1-17. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
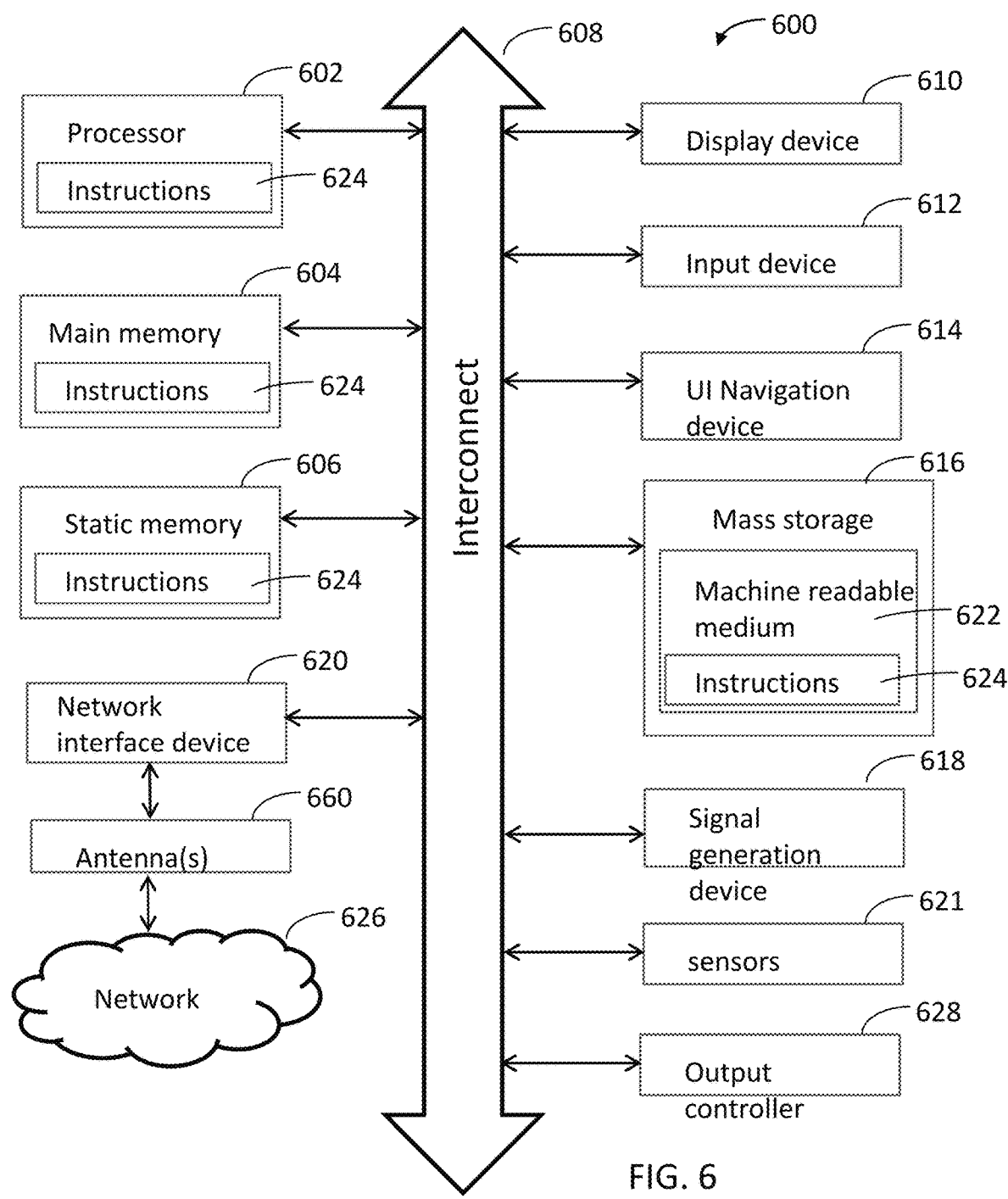
FIG. 6 illustrates a block diagram of an example machine upon which any one or more of the techniques (e.g., methodologies) discussed herein may perform in accordance with some embodiments.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
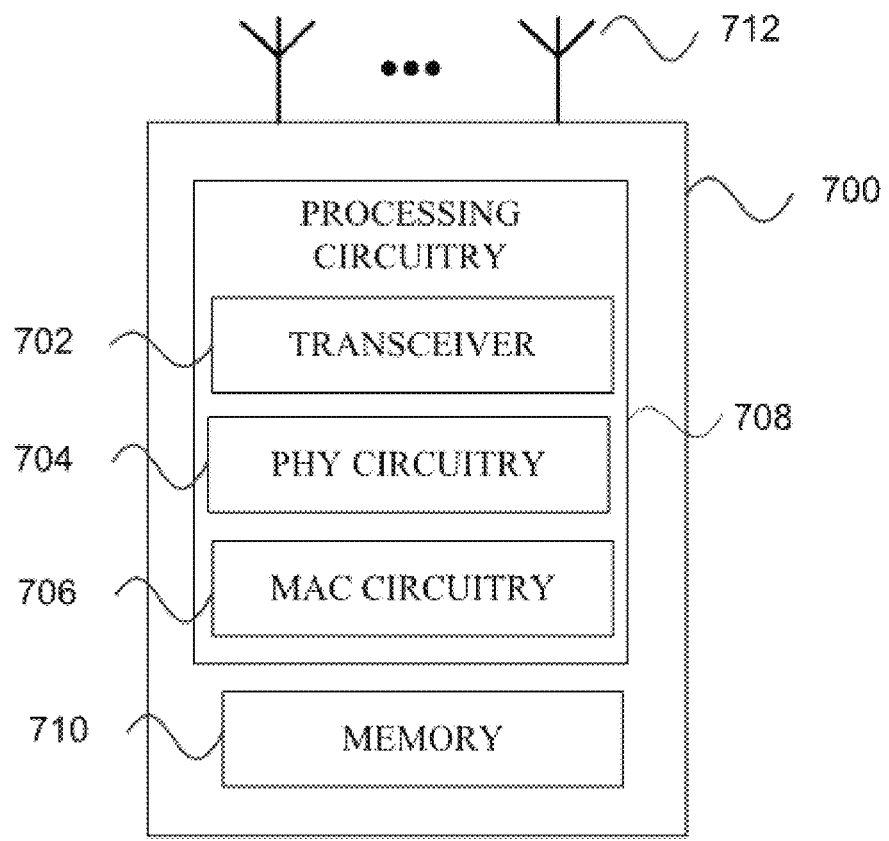
FIG. 7 illustrates a block diagram of an example wireless device upon which any one or more of the techniques (e.g., methodologies or operations) discussed herein may perform in accordance with some embodiments.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an AP (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

As above, the demand for dense deployment of Wi-Fi devices continues to increase. In conventional WLAN systems, the IEEE 802.11 technical standards may not benefit from additional APs operating in a same channel, and may allow only one AP to communicate with a STA at a time. In dense deployments, many APs may be deployed in a given area (e.g., trains, conference halls, stadiums, homes, etc.) and may operate simultaneously. Even though several channels are available, when the deployment is dense, the possibility to share all communication channels may improve the overall system throughput. In the IEEE 802.11be technical standard, addressing EHT for NG Wi-Fi, a coordinated multi-AP concept, is a new development for Wi-Fi. In cellular networks, coordinated multipoint (CoMP) communications are used to enable collaborative or joint processing between multiple base stations. In the IEEE 802.11 technical standards, there have been limited solutions to coordinate multi-AP communications.

Enablement of multiple AP coordination in uplink (UL) and downlink (DL) transmissions to improve area throughput and range in a dense Wi-Fi network may be desirable to provide EHT. This is particularly true in environments or for applications in which communications are to have very high reliability and low latency cell. For example, edge scenarios in which a STA experiences high path loss/interference and industrial use cases, coordinated multi-AP communications may allow the STA to improve reliability and reduce packet loss rates. However, providing a wireless link with high reliability for time sensitive networks over unlicensed bands is challenging to due to the fading, obstruction between the AP and the stations and also the interference. That is, when a large object blocks the direct path between an AP and STA, the link between the AP and STA may be lost. The STA may be, for example, a sensor/actuator device in a factory, a gaming device, or an AR/VR device, for each of which low latency and high reliability is desirable for Time-Sensitive Networking (TSN) capabilities. If other APs operate in the same channel, the additional APs can receive a UL data packet from the STA and share the data packet with the AP over a wired backhaul, thus improving the uplink reliability. However, the manner in which acknowledgement is to be sent from multiple APs to the STAs in a Short Interframe Space (SIFS) time after the reception of the data frame remains an issue. Similarly, in high density Wi-Fi networks in which there are several devices requesting network connection, multiple APs may be deployed that operate in different frequency channels. Coordinated Multi-AP communications allow simultaneous DL transmission for overlapping APs in the same frequency channel.

Accordingly, multiple AP coordination has been added as a candidate feature in EHT to improve the throughput, or worst-case latency performance, for next generation Wi-Fi. The physical layer (PHY) and medium access control (MAC) layer processing for coordinated multi-AP Wi-Fi communications are described in some embodiments below.

In one or more embodiments, the PHY/MAC schemes herein may different levels of implementation complexity and coordination across APs to enable concurrent (e.g., same frequency) overlapping basic service set (OBSS) UL transmissions. Unused receive spatial dimensions at an AP may be used to null the interference with no data exchange across APs. APs jointly may process the received data from the OBSS transmissions. Benefits may include scaling the UL throughput, improving cell edge's quality of service (QoS) (e.g., signal-to-interference-plus-noise ratio, reliability), enabling simultaneous transmission from multiple devices to multiple APs in a same frequency channel, and reducing latency as a result of multi-AP operations.

For coordinated multi-AP communications used in UL communications, each AP may not only receive signals from the desired STAs, but also from co-channel interferers in the neighboring cells. Cell-edge STAs may also experience significant gains by joint or coordinated reception at multiple neighboring APs. An STA that desires high reliability (e.g., mission critical devices) may employ multiple APs that guarantee higher diversity reception, and therefore higher reliability. In some cases, UL multi-AP cooperation may be easier to implement in than DL multi-AP cooperation. In DL schemes, each AP may acquire channels from OBSS STAs, which may increase network overhead. For UL transmissions, OBSS channel information may be available in the network without resource-consuming feedback transmissions.

In one or more embodiments, different levels of coordination may be realized based on deployment and backhauling capabilities. The level of coordination may range from very limited information (e.g., control signals) to a significant amount of information (e.g., received samples for joint processing) exchanged. In one or more embodiments, UL diversity may be enabled by leveraging multiple APs with enhanced acknowledgement mechanisms to address different use cases. Uplink diversity may be enabled in different use cases by leveraging multiple APs with enhanced acknowledgement mechanisms.

For example, Case 1: A single STA sends uplink data without frame aggregation, and the packet is received by multiple coordinated APs. Each AP may provide acknowledgment (ACK) feedback (an ACK frame) when the packet is received correctly. Thus, multiple APs that receive the data may send an identical ACK frame format after the SIFS time.

Case 2: multiple STAs send uplink data without frame aggregation over different resource units (RUs) of the same operating channel and the packets are received by multiple coordinated APs. Each RU here, as below, may be identical (e.g., 10 MHz of a 20 MHz BW of the operating channel) or may be independent of each other RU (e.g., different APs may use different bandwidths—for example, the coordinator AP may be allocated 10 MHz while the coordinated APs may be allocated 5 MHz of the 20 MHz bandwidth). Each AP may send an identical ACK over the RU indicating that the AP received the data correctly. Alternatively, each AP may send a null data packet (NDP) over the RU to indicate successful data reception. Thus, each NDP may be mapped to a different STA.

Case 3: A single STA sends uplink data with frame aggregation and the packets are received by multiple coordinated APs. Each AP may provide an identical ACK as feedback for each MAC protocol data unit (MPDU) over different RUs. Therefore, the number of supported MPDUs for the operating bandwidth may be limited to the number of resource units over the operating bandwidth. Alternatively, each AP may feedback an NDP over an assigned RU_TONE_SET_INDEX for the related MPDU. In this case, for example, when the AP received the $n^{th}$ MPDU correctly, the AP may feedback an NDP over the assigned RU_TONE_SET_INDEX=n. The number of supported MPDUs for the operating bandwidth may be limited to the number of RU_ALLOCATION over the operating channel, which is equal to $18 \times 2^{Operating\ BW}$ Thus, each NDP may be mapped to a different MPDU. Note that although MPDU is used herein, the data unit may be a physical layer conformance procedure (PLCP) protocol data unit (PPDU) with single MPDU (without MAC aggregation) or with multiple MPDUs (with MAC aggregation).

Case 4: Multiple STAs send uplink data with frame aggregation and the packets are received by multiple coordinated APs. In this case, the APs may either send identical ACKs or may send NDPs. In some cases, the APs may send the feedback as long as the total number of MPDUs is not larger than the number of RU_ALLOCATION over the operating channel.

In Coordinated Multi-AP, Per-IC Communications, each AP may not only receive signals from the desired STAs, but also from co-channel interferers in the neighboring cells. In one or more embodiments, a UL coordinated multi-AP scheme may use per-AP interference cancellation (per-AP IC). In this scheme, each AP detects its own STAs. The unused receive spatial dimensions at an AP may be used to null the interference from OBSS STAs, with no data exchange across APs. There is no joint processing required across multi-AP communications. Such simplifies backhaul requirement to support this feature. Each AP may estimate a channel to its associated STAs and also may estimate the interference, and may take spatially colored interference into account when calculating receive filters (e.g., minimum mean square error-interference rejection combining— MMSE-IRC Receiver) as follows. When the received signal at AP, is $y_i = H_i r_i + \Sigma_{i m \ne i} H_{im} \cdot r_m + n$ where $H_i$ is the desired channel from STA-i and $H_{im}$ is interference link from STA-m (associated to $AP_m$), $r_i$ and $r_m$ are the reference signals transmitted from STA-i and STA-m, then covariance matrix of I=(Interference+Noise), $R_{ii}$, can be estimated as $$I \approx y_i - \tilde{H}_s r_i \to R_{ii}.$$

In Coordinated Multi-AP Communications to Improve Reliability for a Cell Edge User, a UL coordinated multi-AP scheme may use a diversity reception scheme. This scheme may improve signal-to-interference ratio (SINR), range and reliability of the cell edge user through diversity. Another other use case may include a device that desires high reliability. There may be no joint processing across APs. The STA may be detected by each single AP (e.g., individually). Either APs who successfully receive data may send an acknowledgement. This method acts as switch receive diversity and provides a second path for reliability. Alternatively, the detected data at one AP may be shared with other APs to boost SINR. This scheme can be applied for single user (SU) or multiuser (MU) OFDMA.

In Coordinated Multi-AP Communications Providing Joint Processing in Overlapping Cells with Unbalanced Load, a UL coordinated multi-AP scheme may use a joint reception scheme. In this scheme the received data from all STAs in OBSS may be jointly processed, which may result in a multi-AP array gain and combining gain. This works even in cases of unbalanced loads across multiple cells. Multi-AP receiver gain may be maximized, but tight synchronization may be used across APs. A higher front-haul rate and stringent latency may be used from participating nodes to a central processor where the joint decoding takes place. One of the APs can be the central processor.

In Single-AP Decoding with Successive IC, a UL coordinated multi-AP scheme may use a distributed interference cancellation (DSIC) scheme. This scheme is a single-AP decoding scheme with successive interference cancellation (SIC). There may be no joint multi-AP processing, but some data exchange may be used across APs. There are multiple stages: Stage-1: Each AP decodes data from in-cell STAs and forward to other APs for interference subtraction. Channel estimation is performed for in-cell and OBSS STAs. Stage-2: Each AP receives the decoded data for interfering STAs and performs second stage equalization by removing interference data received from other APs. This scheme may use high speed backhaul capability.

In one or more embodiments, devices may use channel/interference estimation in UL coordinated multi-AP communications. STAs in a collaborative set (e.g., OBSS) are directed to send orthogonal training signals for channel estimation. This is may be used to enable interference-free channel estimation followed by interference estimation. The training signals may be made orthogonal by spatial multiplexing: Matrix-P with dimensions equal to number of spatial symbols in all STAs may be used to multiplex the training signals. Time-division multiple access (TDMA) IEEE 802.11ax Trigger frames and/or UL MU multiple input, multiple output (MIMO) may be extended to trigger all STAs in OBSS to send data packets. A user info field of the Trigger frame may define STAs identifiers, time/code for multiplexing of training fields, etc.

In one or more embodiments, devices may use trigger-based UL control sequences. In a first embodiment, the initiator AP (e.g., master AP) may send a Trigger frame to initiate the coordination. The AP IDs for all participating APs and STA information (there may be only STAs associated to a master AP or there may be all OBSS STAs) may be identified in this first Trigger frame. After a SIFS time, all coordinated APs may send the same Trigger frame (e.g., simultaneously) for UL MU transmission, identifying coordinated AP IDs, all the STAs (e.g., OBSS) information, etc. This may trigger data transmission from all STAs. Alternatively, one Trigger frame may be sent from a master AP, assuming all OBSS STAs can hear the initiator AP. In a second embodiment, there is an extra packet exchange across APs for handshaking and forming the coordinated set. APs may send trigger packets sequentially for handshaking with other APs, initiating coordination and announcing their user information, buffer size etc. After the group is formed, the sequence may follow the first embodiment. APs may transmit Bas multiplexed in time or frequency.

In one or more embodiments, the APs may use an acknowledgment. The APs may transmit a block ACK (BA) in a coordinated set multiplexed in time or frequency. There may be other ways to transmit an ACK. In per-AP interference cancellation and DSIC, each AP may send a BA for its associated STAs. In JR, one BA is sent from the master AP. In diversity reception, if a STA receives a BA from any of the APs, that would be sufficient. In JR and DSIC, because some data exchange is used across APs, when the backhaul speed is not high enough, delayed BA may be enabled and indicated to the STAs. BA policy may be indicated in UL Trigger frame. In one or more embodiments, devices may use SU mode. In SU mode, either an AP may trigger UL data transmission, or the STA may trigger multi-APs for collaborative reception in UL.

In one or more embodiments, different schemes for coordinated multi-AP UL communications may each require different level of coordination and backhaul capability. Per-AP IC may use minimal backhaul support and be transparent to STAs, but may not be effective in high interfering scenarios. The number of interference nulling directions may be limited by unused receive spatial dimensions at each AP. JR and DSIC may provide the highest performance gains, but they require very high speed backhaul. The diversity reception scheme may improve reliability of a cell edge user.

Assuming that the UL multiple AP coordination configuration is performed, multiple APs can process a data packet received from a STA as long as the APs are part of a multi-AP coordination group for a given STA. For a STA to take advantage of the enhanced diversity provided by multiple APs, the STA may be assigned a coordinator AP and multiple coordinated APs as shown in Table 1 below. Table 1 may be available in all of the coordinated APs.

TABLE 1

UL Multiple AP Coordination Mapping Table

| STA | Coordinator AP | Coordinated APs list | Acknowledgement (optional) |
| --- | --- | --- | --- |
| STA 1 (MAC address) | AP1 (BSS ID or color ID) | AP2, AP3 (BSS ID or color ID) | RU1 with 4 MHz is assigned for AP1, RU2 with 4 MHz is assigned for AP2, RU3 with 8 MHz is assigned for AP3 |
| ... | ... | ... | |

AP1 is the coordinator AP of the STA, different STAs may have different coordinator APs. However, once the coordinator AP is triggered by any of the coordinated APs (such as Multiple AP OFDMA), the coordinator AP may feedback the data at SIFS time after the reception of the Trigger frame. In this case, the STA may be aware of its coordinated APs. The Trigger frame may indicate the ID (AID or MAC address) of the triggered sensors with uplink transmission parameters. Based on traffic pattern of the sensor, AP1 may start to contend the channel before the expected time if the AP knows that when the uplink packet is generated at the sensor over the operation channel. Once AP1 senses that the channel is available, AP1 may send a Trigger frame to the sensor over the operating channel. As shown in the following figures, different cases exist dependent on whether a single user or multiple users are present, and whether frame aggregation is used.

Figure 8:
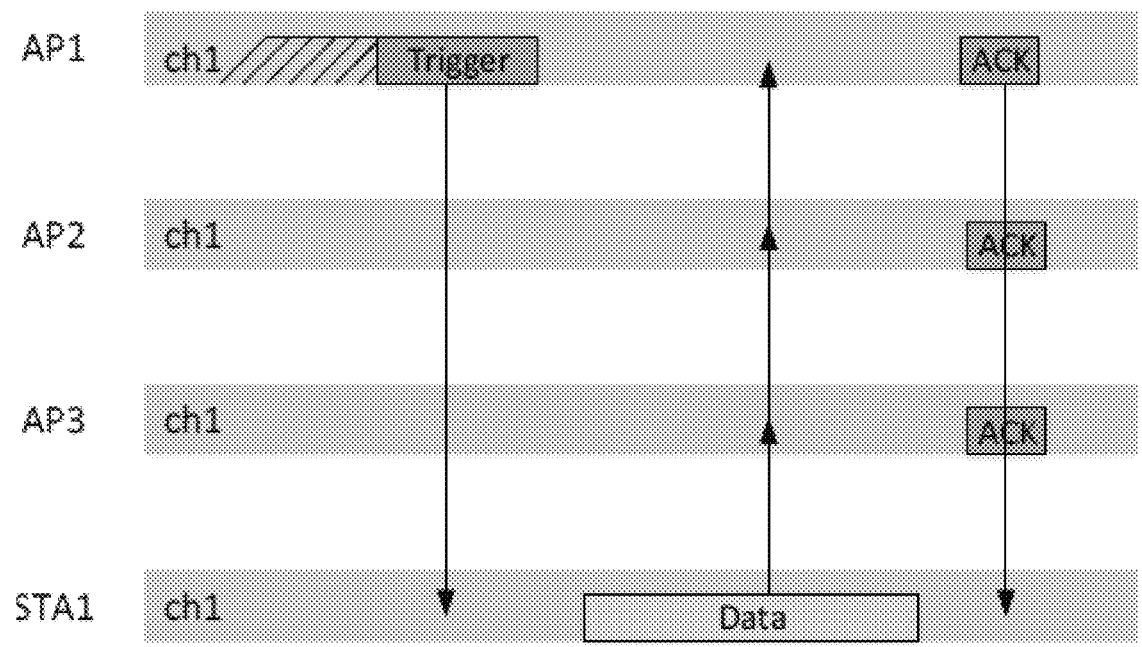
FIG. 8 illustrates single user uplink transmission with multiple access points and no frame aggregation, in accordance with some embodiments.
Figure 9A:
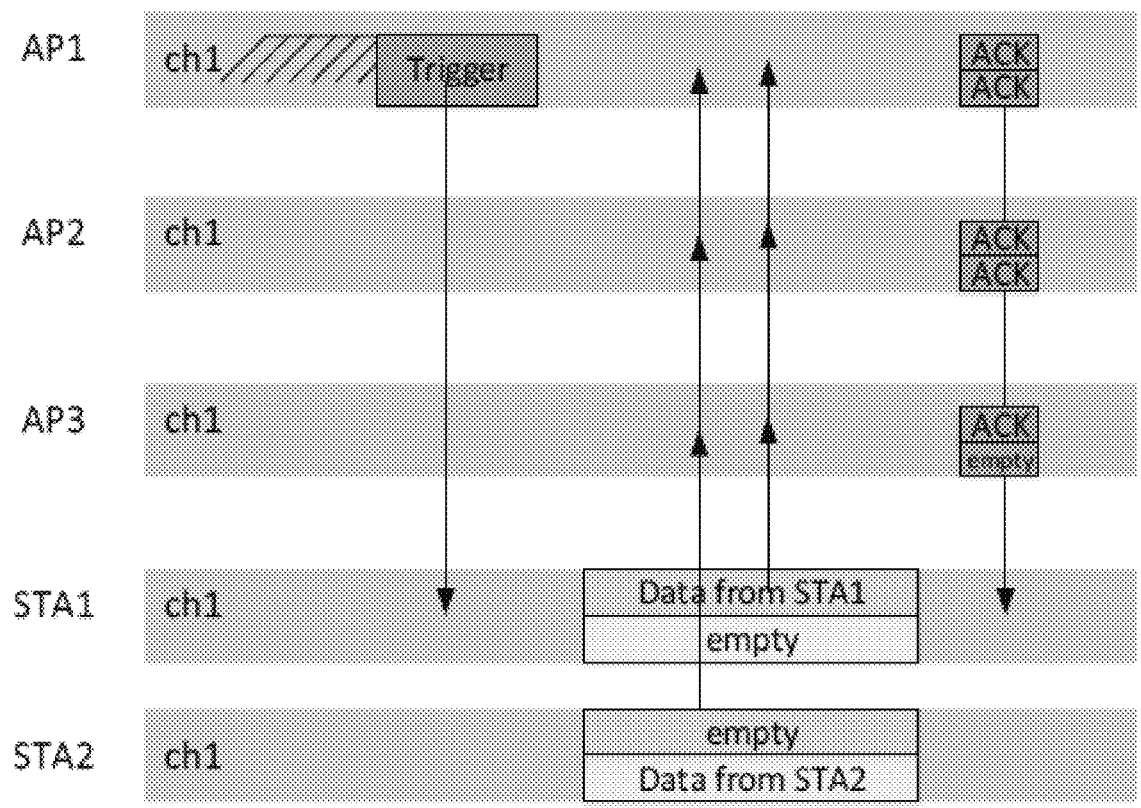
FIG. 9A illustrates multi-user uplink transmission with multiple access points and no frame aggregation, in accordance with some embodiments.
Figure 9B:
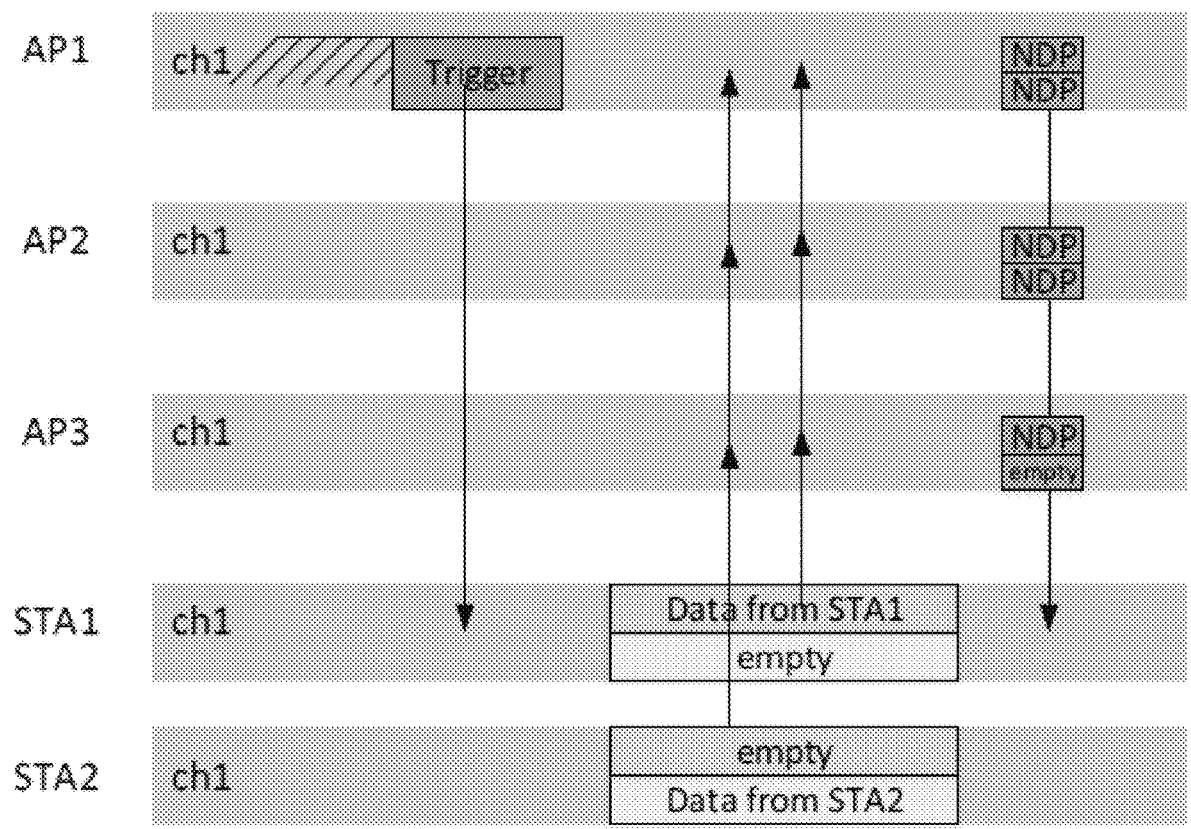
FIG. 9B illustrates multi-user uplink transmission with multiple access points and no frame aggregation, in accordance with some embodiments.
Figure 10A:
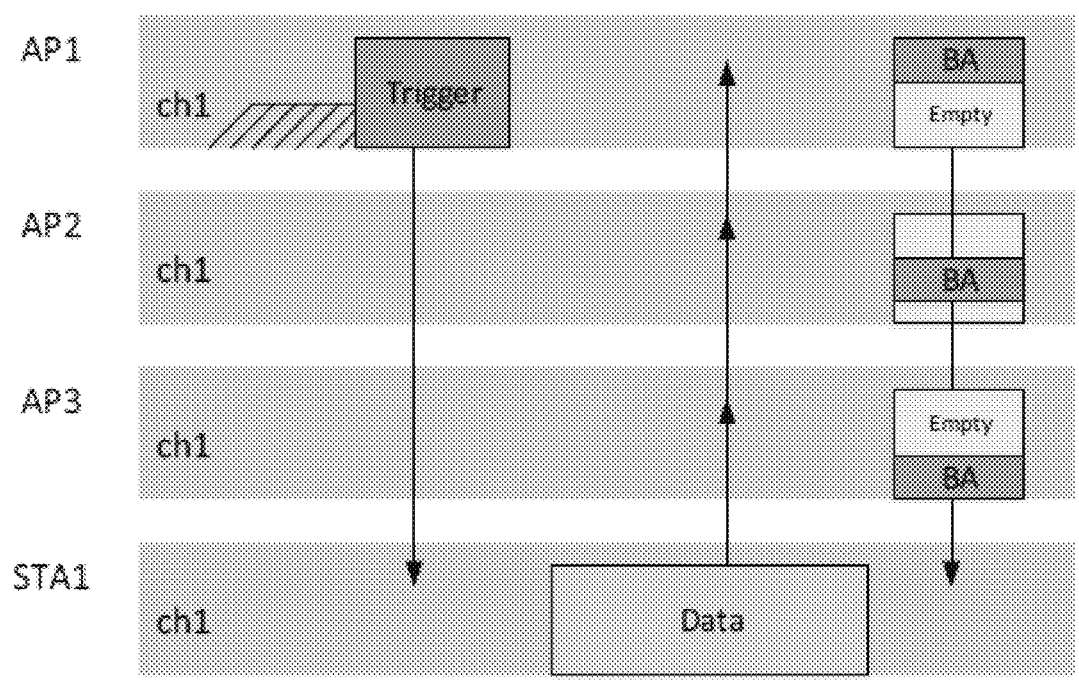
FIG. 10A illustrates single user uplink transmission with multiple access points and frame aggregation, in accordance with some embodiments.
Figure 10B:
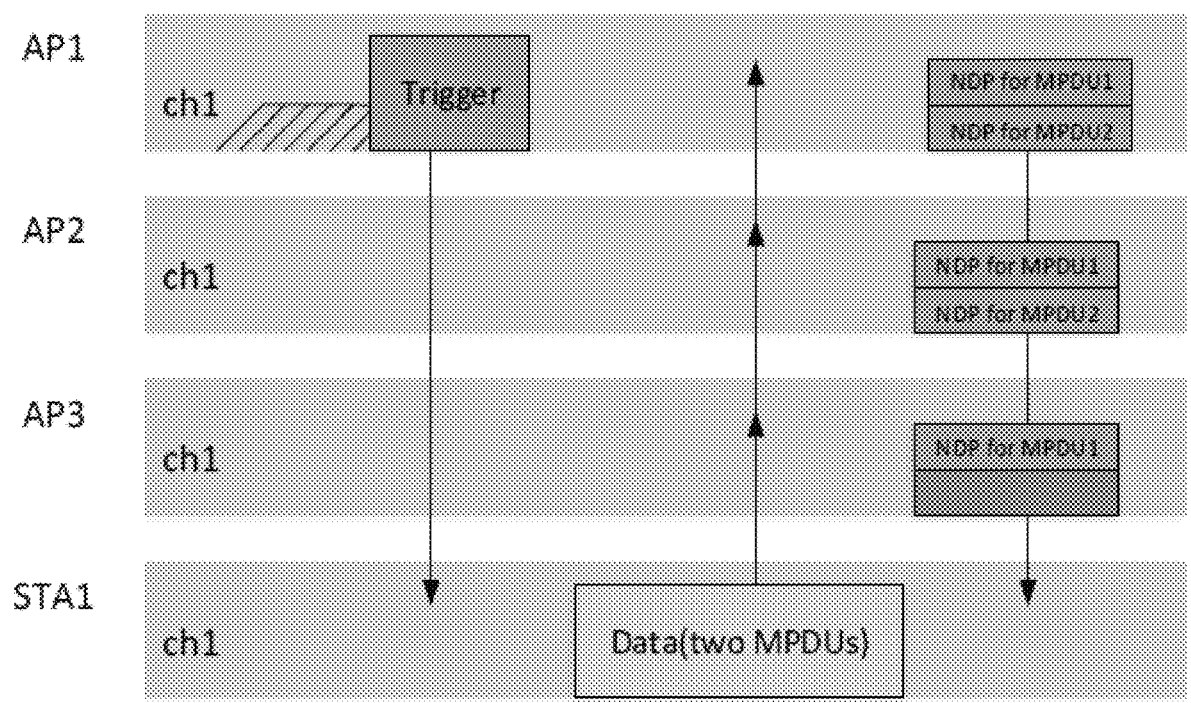
FIG. 10B illustrates single user uplink transmission with multiple access points and frame aggregation, in accordance with some embodiments.

FIG. 8 illustrates single user uplink transmission with multiple access points and no frame aggregation, in accordance with some embodiments. In this case, the SU may be triggered by the master AP to send uplink data packet. As shown in FIG. 8, STA1 may send feedback the data frame without frame aggregation over the channel i. FIG. 9A illustrates multi-user uplink transmission with multiple access points and no frame aggregation, in accordance with some embodiments. FIG. 9B illustrates multi-user uplink transmission with multiple access points and no frame aggregation, in accordance with some embodiments. FIG. 10A illustrates single user uplink transmission with multiple access points and frame aggregation, in accordance with some embodiments. FIG. 10B illustrates single user uplink transmission with multiple access points and frame aggregation, in accordance with some embodiments. In one or more embodiments, the devices may use ACKs as mechanisms for trigger-based transmissions.

Sensor (STA1): Upon the reception of the Trigger frame, the sensor may follow a standard trigger-based procedure to prepare an uplink data packet with the transmission parameters indicated in the Trigger frame and send the uplink data packet to the AP1 over the operating channel. For the UL MU OFDMA, the Trigger frame may also indicate the frequency resource unit that each sensor should use for the uplink packet transmission.

Case 1: Single user is triggered by the master AP to send uplink data packet. As shown in FIG. 8, STA1 may send the data frame without frame aggregation over the channel on which the Trigger frame was received from AP1 a SIFS time after the reception of the Trigger frame from AP1.

Case 2: More than one user may be triggered by the AP to send an uplink data packet to the AP over the assigned RUs. As shown in FIGS. 9A and 9B, STA1 and STA2 may feedback data frame without frame aggregation over the assigned RUs an SIFS time after the reception of the Trigger frame from AP1.

Case 3: Single user is triggered by the master AP to send uplink data packet. As shown in FIG. 10A, STA1 may send the data frame with frame aggregation over the channel on which STA1 received the Trigger frame from AP1 an SIFS time after the reception of the Trigger frame from AP1. Whether frame aggregation is to be used can be decided by the AP or the STA. If it is decided by the AP, the decision can be indicated by the AP in the Trigger frame with acknowledgement approach that AP may use for the acknowledgement.

All the coordinated APs (AP1-AP3): All the APs who hear the uplink data packet over channel 1 may start the packet reception as shown in FIGS. 8-10. If the packet is received correctly, the AP may check if the receiver address is one of the coordinated APs for the transmitting STA, and execute the proper acknowledgement mechanism, depending on the case. The AP may also pass the payload of the MAC frame to the higher layer as a successful data packet. In one embodiment, this may trigger the upper layers to forward the data packet to the wireless TSN controller. As a result, the sensor can benefit from higher diversity to achieve higher reliability. If the link between the sensor and one of the coordinated APs is blocked by an obstruction, the packet may still be able to be received by other coordinated APs.

Acknowledgement Mechanisms for Trigger-Based Transmissions:

Case 1: If there is only one user sending uplink data without frame aggregation, each coordinated AP may send an identical ACK frame an SIFS time after the reception of the uplink data frame, as shown in FIG. 8. Case 2: If there are more than one user sending uplink data without frame aggregation over different RUs, each coordinated AP may send an identical ACK or a NDP over the RU on which the AP received the uplink data frame a SIFS time after the reception of the uplink data frame as shown in FIGS. 9A and 9B.

Case 3: if there is only one user sending uplink data with frame aggregation, there are two options. Option 1: each AP may use different RUs to send the block acknowledgement a SIFS time after the reception of the uplink data frame. The RU assignment information can be indicated in the Trigger frame if the uplink transmission is triggered by the AP or indicated by one MPDU (such as the first or last MPDU) in the payload, or is predefined for each uplink STA as shown in Table 1. As shown in FIG. 10A, AP1-AP3 may use different RUs to feedback BA. Option 2: Each AP may use different RU_TONE_SET_INDEX to feedback NDPs to indicate whether the AP received the MPDU from the STA correctly. For example, if the AP received the $n^{th}$ MPDU correctly, the AP may send an NDP over the assigned RU_TONE_SET_INDEX=n. The number of supported MPDU for the operating bandwidth may be limited to the number of RU_ALLOCATION over the operating channel, which is equal to $18 \times 2^{Operating\ BW}$ As shown in FIG. 10C, after the STA1 sends two MPDUs, AP1 and AP2 may send an NDP over both the first and second RUs, while AP3 may send an NDP over only the first RU since AP3 only received the first MPDU from the STA1 correctly. The MPDU sequence number and RU location mapping table may be uniform among all of the coordinated APs.

In some embodiments, the coordination among multiple APs may be done through (wired or wireless) backhaul and managed by the wireless TSN controller. The STA may be aware of the acknowledgement approaches the AP is going to use, which can be predefined or indicated in the Trigger frame sent by the AP. If the methodology shown in FIG. 9A or 10A is to be used, the RU assignment for each coordinated APs may be provided by the STA or indicated by the Trigger frame. If the methodology shown in FIG. 9B or 10B is to be used, the mapping between the MPDU and RU location can be defined in different way, but may be uniform among all of the coordinated AP and known to the STA.

Acknowledgment Mechanisms for Single User Transmission

Sensor (STA1): when the sensor has uplink data packet to send to the AP, STA1 may contend for the channel over all of the operation channels. Once STA1 senses that the channel is available, STA1 may send the uplink data packet with the receiver address as the MAC address of the coordinator AP or with destination address as the MAC address of the wireless TSN controller. In another embodiment, STA1 may use the address of a virtual coordinated AP that represents the group of coordinated APs.

All the coordinated APs (AP1-AP3): All the APs that hear the uplink data packet may start the packet reception. If the packet is received correctly, and the receiver address is one of the APs with which the AP is coordinated or the destination address is the MAC address of the wireless TSN controller or a virtual coordinated AP, the AP may execute the proper ACK mechanism a SIFS time after the reception of the uplink data packet and pass the packet to the higher layer.

Figure 11A:
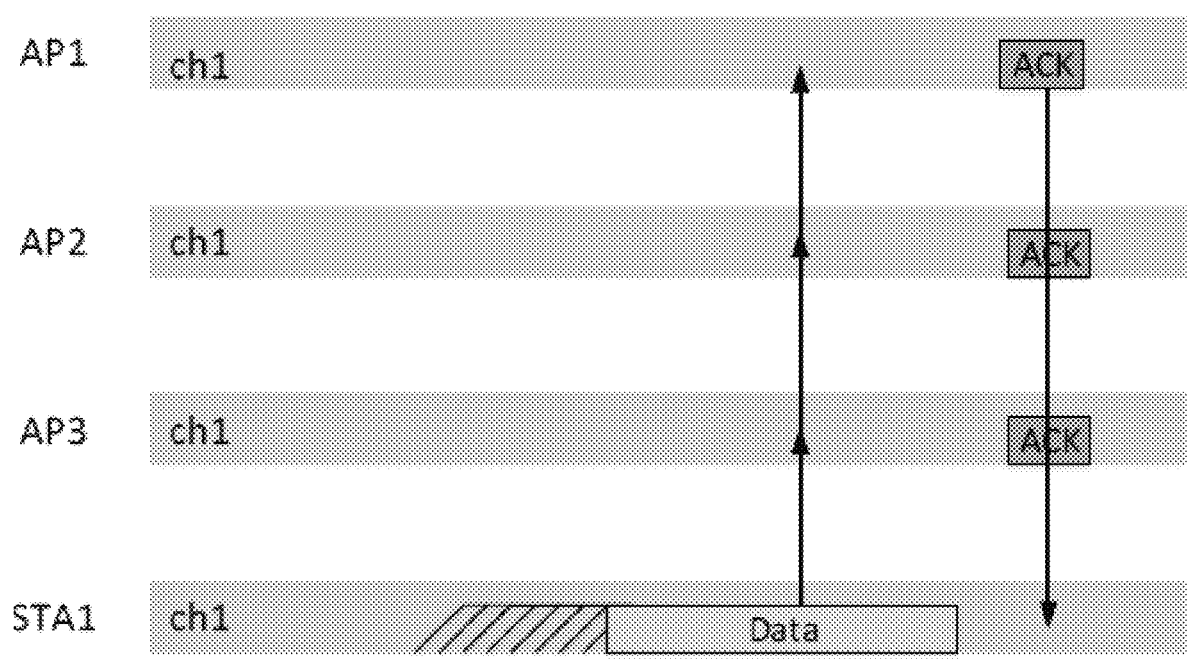
FIG. 11A illustrates single user uplink transmission with multiple access points and no frame aggregation, in accordance with some embodiments.

Acknowledgement Mechanisms:

Case 1: If there is only one user sending an uplink data packet without frame aggregation, each coordinated AP may provide, as feedback, an ACK a SIFS time after the reception of the uplink data frame as shown in FIG. 11A. FIG. 11A thus illustrates single user uplink transmission with multiple access points and no frame aggregation, in accordance with some embodiments.

Figure 11B:
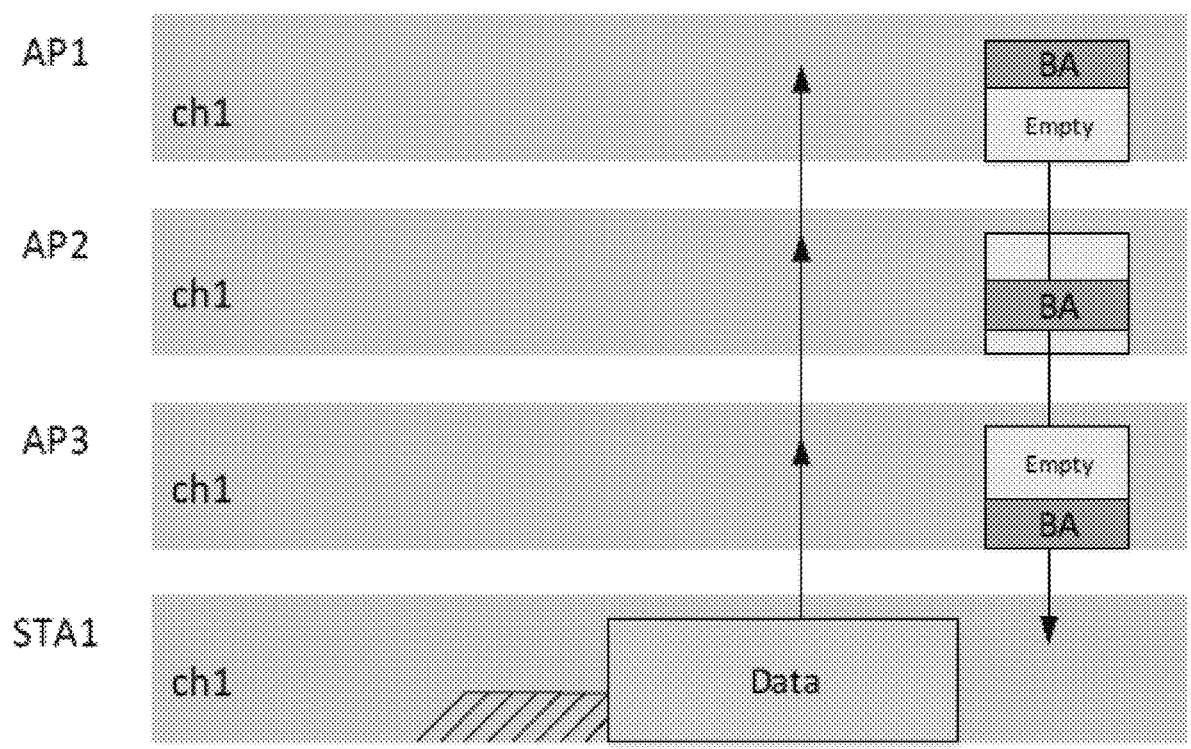
FIG. 11B illustrates single user uplink transmission with multiple access points and frame aggregation, in accordance with some embodiments.

Case 2: if there is only one user sending uplink data packet with frame aggregation, one of two options may be used. Option 1: Each AP may use different RUs to feedback the block acknowledgement a SIFS time after the reception of the uplink data frame. The RU assignment information can be indicated in the uplink data frame, or can be predefined when the uplink coordination is set up throughput backhaul. The STA may be aware of the RU assignment information. FIG. 11B illustrates single user uplink transmission with multiple access points and frame aggregation, in accordance with some embodiments. As shown in FIG. 11B, AP1-AP3 may use different RUs to feedback the BA. In this case, both the RU size and location can be assigned by the triggered AP or the STA.

Figure 11C:
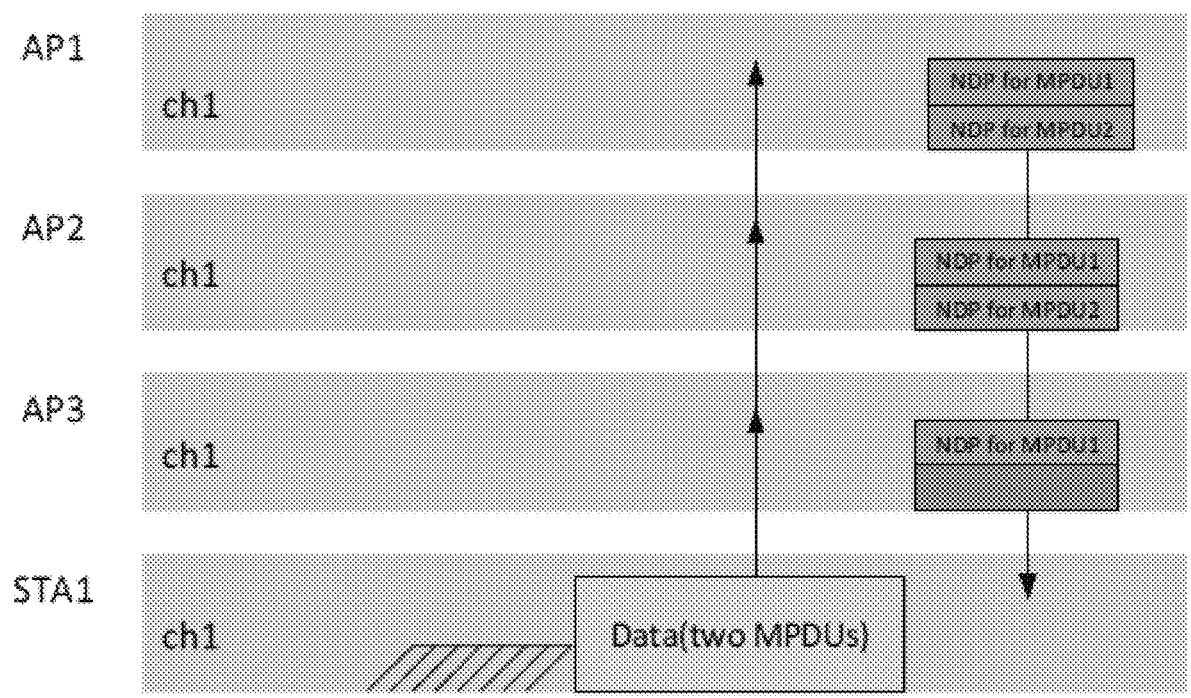
FIG. 11C illustrates single user uplink transmission with multiple access points and frame aggregation, in accordance with some embodiments.

Option 2: Each AP may use a different RU_TONE_SET_INDEX to feedback NDPs to indicate whether the AP received the MPDU from the STA correctly. For example, if the AP received the $n^{th}$ MPDU correctly, the AP may feedback an NDP over the assigned RU_TONE_SET_INDEX=n. The number of supported MPDU for the operating bandwidth may be limited to the number of RU_ALLOCATION over the operating channels, which is equal to $18 \times 2^{Operating\ BW}$. FIG. 11C illustrates single user uplink transmission with multiple access points and frame aggregation, in accordance with some embodiments. As shown in FIG. 11C, after the STA1 sends two MPDUs, AP1 and AP2 may send an NDP over both the first and second RUs, AP2 (which received only the first MPDU from the STA1 correctly) may send an NDP only over the first RU since AP2 only received the first MPDU from the STA1 correctly.

Data Sharing Over the Backhaul:

Different options exist to share the data from the coordinated APs to the coordinator AP. Option 1: the coordinated APs may forward all the MPDUs received correctly to the coordinator AP. Option 2: the coordinator AP can broadcast or multicast the master AP's reception information to all of the coordinated APs and all of the coordinated APs may only forward an MPDU that is received correctly by the coordinated AP, but is not received by the coordinator AP, to the coordinator AP. Option 3: all of the coordinated APs may send the reception information to the coordinator AP. Based on the reception information, the coordinator AP may send an MPDU request to the coordinated AP and coordinated AP may forward the MPDU that the coordinator AP has requested.

Delayed BA for Case 3 and Case 4:

A delayed BA can also be used in uplink multiple AP coordination to reduce the overhead due to the BA from multiple coordinated APs. The STA may send data with a delay BA option. The delay BA option can be also indicated in the Trigger frame if a trigger-based uplink transmission. Upon the reception of the uplink data packet from the uplink STAs, all of the coordinated APs may save the data. If option 1 or option 2 is used for data sharing from the coordinated APs to the coordinator AP, the coordinator AP may send the BA after waiting for the MDPU from all of the coordinated APs for a predetermined time period. If option 3 is used for data sharing from the coordinated APs to the coordinator AP, the coordinator AP may send the integrated BA to the STA after the coordinator AP receives the reception information from all of the coordinated APs. The coordinator AP can send the BA once all of the MPDUs are received correctly, either from the STA directly or shared by the coordinated APs over the backhaul.

Thus, in various embodiments, a STA may send a MPDU in a channel in which multiple APs are operating. The STA may be one of multiple STAs sending respective MDPUs. In some embodiments, the STA may use frame aggregation, while in other embodiments frame aggregation may not be used. A respective MDPU may be sent in an allocated RU. MPDUs may be addressed to a master AP in a group of APs in a same channel.

The STA may identify a first ACK received from a first AP using the channel in response to the MPDU. The first AP may be a master AP or another AP in the same channel. The first ACK may be an NDP or another type of frame. The first ACK may, in some embodiments, be received in the same RU as the MPDU was sent or a different RU may be used, which may be indicated to the STA prior to reception of the first ACK. Similarly, the STA may identify a second ACK received from a second AP using the channel in response to the MPDU. The second AP may be a master AP or another AP in the same channel. The second ACK may be an NDP or another type of frame and may be received in the same RU as the MPDU was sent or a different RU may be used, which may be indicated to the STA prior to reception of the second ACK.

In addition to coordinating UL data and ACK transmissions, a variety of techniques may be used to provide coordination among the APs to achieve better performance. These techniques may include coordinated techniques such as coordinated scheduling, coordinated beamforming, and coordinated OFDMA, and joint techniques such as joint processing, distributed Multiple-Input Multiple-Output (MIMO) etc. These techniques assume the basic structure of an EHT Multi-AP group as follows: one AP (e.g., AP1 shown in FIGS. 8-11) acts as the master or coordinator AP, that can reach other APs. The coordinator AP controls or coordinates the schedule and transmission among all APs in the group. One or more APs (e.g., AP2 and AP3 in FIGS. 8-11) act as the slave or coordinated APs. These APs receive control or schedule information from the coordinator AP, and execute operation instructed by the coordinator AP.

Figure 12:
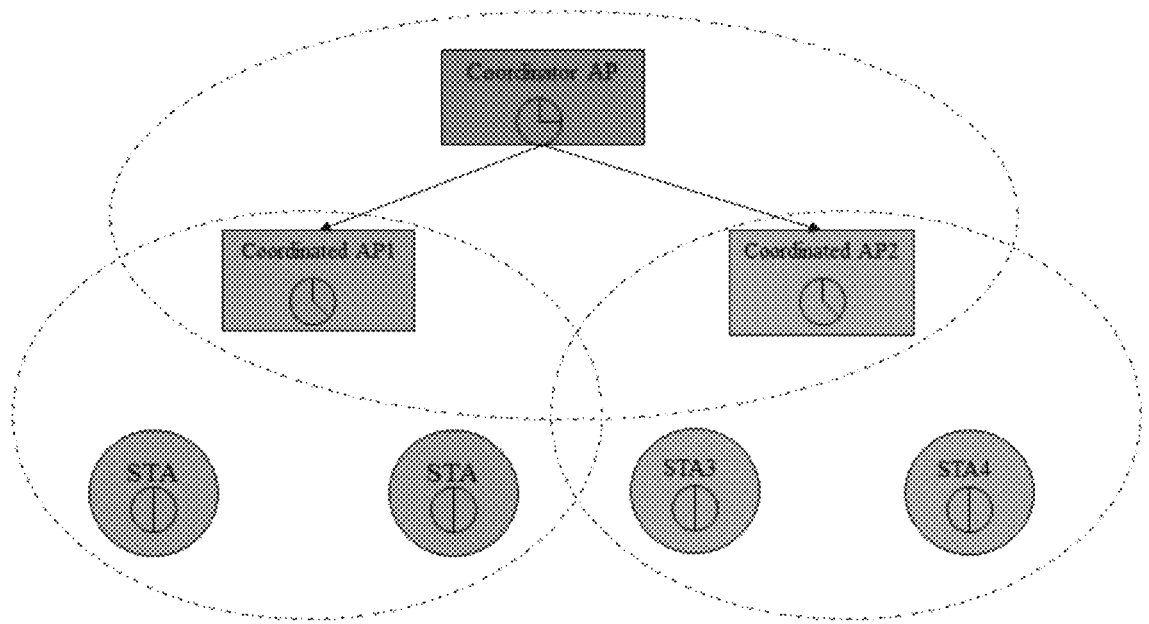
FIG. 12 illustrates propagation of clock differences within an EHT Multi-AP group in accordance with some embodiments.

The multi-AP operations within an EHT Multi-AP group may use time synchronization between the coordinator AP and coordinated APs. Otherwise, if discrepancies exist between the clocks of the coordinator AP and coordinated APs, issues may arise. One such issue may include interruptions to coordinated or joint scheduling; for example, the time allocations may be overlapping due to clock differences, which may lead to interference among the APs. Another such issue may include propagation of the clock differences to lower-level STAs or APs. For example, if the EHT Multi-AP group has multiple hops, clock differences in the upper-hop APs may propagate to, and perhaps be exacerbated by, lower-hop APs. Moreover, clock differences between the coordinated APs and coordinator AP may also propagate to STAs associated to the coordinated APs. This may cause interruptions when STAs interpret the timing information for upcoming transmissions. FIG. 12 illustrates propagation of clock differences within an EHT Multi-AP group in accordance with some embodiments.

To provide synchronization, time synchronization within the same BSS, hybrid coordination function (HCF) controlled channel access (HCCA) AP timing synchronization, DMG/EDMG time synchronization, or S1G/11ah time synchronization may be used in some instances. For time synchronization within the same BSS, STAs in the same BSS may be synchronized to a common clock using timing synchronization function (TSF). The AP may be the timing master for the TSF, and STAs synchronize the TSF timers based on the TSF timing information received in a Beacon frame transmitted by the AP. For HCCA AP timing synchronization, IEEE 802.11 defines a HCCA AP timing synchronization protocol that is used to synchronize the TSF timing between an HCCA AP with its APs in OBSSs, so that the HCCA TXOP advertisement does not suffer from time differences between the clocks of the overlapping APs. For DMG/EDMG time synchronization, aside from Beacon frames, IEEE 802.11ad/11ay defines a new frame, called an Announce frame, which can perform various management functions similar to Beacon frame by including different action fields. Timestamp field is included in the Announce frame to facilitate time synchronization. For S1G/11ah time synchronization, IEEE 802.11ah defines a new frame, called a Timing Advertisement frame, which includes the Time Advertisement element and can be used for time synchronization. However, except for HCCA AP timing synchronization, all of these time synchronization protocols focus on time synchronization within the same BSS between the AP and its associated STAs. HCCA AP timing synchronization protocol considers time synchronization among APs from different BSSs, but HCCA is not implemented in practice.

Accordingly, two additional options are provided to perform time synchronization between the coordinator AP and coordinated APs within an EHT Multi-AP group. In a first option, the HCCA timing synchronization protocol may be used, but may rely on Beacon frames transmitted by the coordinator AP to maintain time synchronization. In a second option, the modifications from IEEE 802.11ad/11ay/11ah may be used, a Timestamp field or one or more additional timing information fields being added to Multi-AP Trigger frames, or a new Container frame (or any other control or management frame) may be exchanged between the coordinator AP and coordinated APs to enable more flexible time synchronization that does not rely on Beacon frames.

Figure 13:
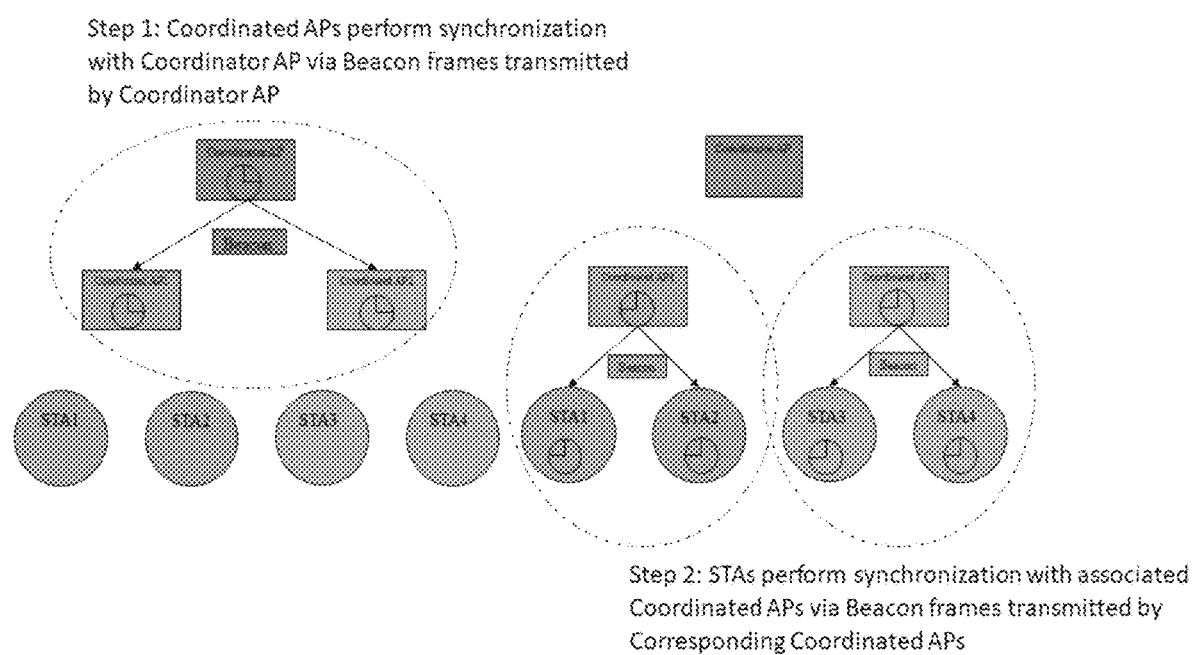
FIG. 13 illustrates multi-AP time synchronization within an EHT Multi-AP group in accordance with some embodiments.

FIG. 13 illustrates multi-AP time synchronization within an EHT Multi-AP group in accordance with some embodiments. In the embodiment shown in FIG. 13, in which the first option is used, the HCCA timing synchronization protocol may be used, using periodic Beacon frames transmitted by the coordinator AP to perform time synchronization, including timing offset compensation and clock drift adjustment. As all coordinated APs in the EHT Multi-AP group may be able to talk to the coordinator AP of the EHT Multi-AP group, the coordinator AP may be able to provide synchronization to the coordinated APs. After the coordinated APs are synchronized with the coordinator AP, STAs within a coordinated AP's BSS can further perform synchronization with the corresponding coordinated AP using a TSF timer method (the STA aligning to the timestamp value of the corresponding coordinated AP in a Beacon or other frame containing the timing information or using the timing interval between frames from the corresponding coordinated AP). As a result, all APs and STAs in the Multi-AP network are able to be synchronized. The specific procedures to perform timing offset compensation and clock drift adjustment can be similar to those introduced in 802.11 REVmd D2.0 Section 11.27.4.2 and 11.27.4.3, respectively.

In particular, a coordinated AP may update a timing offset value based on time stamps from the Beacon frames received from the coordinator AP. The timing offset value is calculated by Toffset=TT−TR, where Toffset is the timing offset value, TT is the value in the Timestamp field in the received Beacon frame, and TR is the Beacon frame reception time measured using the coordinated AP's TSF timer. The coordinated AP may keep the Toffset value calculated from the latest Beacon frame received from the coordinator AP.

The clock drift compensation may include a) If the coordinated AP does not have a valid Toffset value obtained from the previous Beacon frame reception from the coordinator AP, the coordinated AP may not adjust for the clock drift compensation. b) When the coordinated AP receives a Beacon frame from the coordinator AP, the coordinated AP may calculate the clock drift amount TClockDrift by comparing the Toffset obtained previously from the coordinator AP and the Toffset obtained from the Beacon frame reception. TClockDrift=Toffset,1−Toffset,0 where TClockDrift is the clock drift amount, Toffset,1 is the Toffset obtained from the previous reception Toffset, 0 is the Toffset obtained from the current frame reception. c) The coordinated AP may calculate the TClockDrift value for the coordinator AP and select the largest TClockDrift value. If the largest TClockDrift is greater than zero, the coordinated AP may suspend its TSF timer for the duration of the largest TClockDrift. The coordinated AP may suspend its TSF timer frequently enough that the delay during a single beacon period does not exceed 0.08% of its beacon interval.

Figure 14:
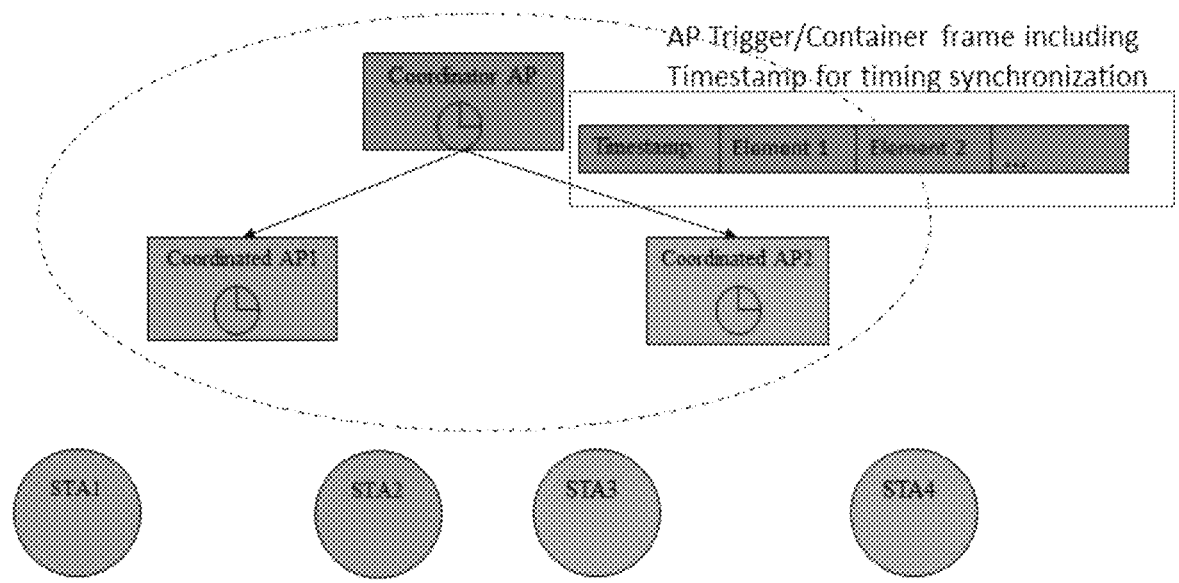
FIG. 14 illustrates multi-AP time synchronization within an EHT Multi-AP group in accordance with some embodiments.

FIG. 14 illustrates multi-AP time synchronization within an EHT Multi-AP group in accordance with some embodiments. In the embodiment shown in FIG. 13, in which the second option is used, a Timestamp field or a timing information field is added to a frame other than the Beacon frames. This provides additional flexibility to perform time synchronization between the coordinator AP and the coordinated APs, as the coordinated APs may miss Beacon frames due to various reasons. One such frame may be the AP Trigger frame, which is transmitted by the coordinator AP to the coordinated APs to trigger operations at the coordinated APs.

In other embodiments, like the Announce frame in IEEE 802.11ad/11ay, a Container frame may be defined for EHT. This frame may include a Timestamp field that can be used for time synchronization, and can further include different information elements to perform different management functions. The use of a Container frame may enable flexible on-demand time synchronization, permitting the management function to obtain time synchronization whenever desired.

TABLE 1

Container frame Action field format. Reference:
REVmd D2.0, 9.6.21.2 Announce frame format.

| Order | Information | Notes |
|---|---|---|
| 1 | Category | The Category field is defined in 9.4.1.11 (Action field) |
| 2 | Unprotected Action | Unprotected Action frames are not encapsulated using mechanisms defined for robust management frames. Can define the corresponding Unprotected Action field if desired. |
| 3 | Timestamp | The Timestamp field is defined in 9.4.1.10 (Timestamp field). |
| 4 | Beacon Interval | The Beacon Interval field is defined in 9.4.1.3 (Beacon Interval field) and specifies the duration of the beacon interval of the BSS. |
| 5 | Optional element | |
| 6 | Optional element | |
| . . . | . . . | |

The Category field is set to one of a plurality of nonreserved values that indicates one of a plurality of actions (management functions) indicated by the frame (e.g., Spectrum management, QoS). The Timestamp field is an 8 octet field that represents the TSF timer. The Beacon Interval field is a 2 octet field that represents the number of time units between target beacon transmission times (TBTTs).

Thus, in some embodiments, one or more coordinated APs within an EHT multi-AP group may be identified and may synchronize exclusively (among APs) with the coordinator AP. The coordinated APs may be synchronized using a synchronization frame, such as a periodic Beacon frame, and/or a non-periodic Trigger frame or Container frame. The synchronization frame may be transmitted by a coordinator AP of the EHT multi-AP group and received by the coordinator APs of the EHT multi-AP group. Each STA within the BSS of each coordinated AP may then be synchronized to the associated coordinated AP and thus coordinator AP using a TSF timer. In some cases, the inclusion of timing information in the periodic or non-periodic frame may be automatic. In some embodiments, both periodic and non-periodic frames may be used for synchronization as a coordinated AP may be communicating with its associated STAs during the Beacon frame period, and thus be unable to receive the Beacon frame (and thus synchronize with the coordinator AP). In some embodiments, only non-periodic frames may be used for synchronization as synchronization may be used initiated only when functionality or communications with the coordinator AP are desired.

It will thus be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical parameters on their objects.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising processing circuitry and memory, the processing circuitry to configure the AP to operate as a coordinated AP in an extreme high throughput (EHT) multi-AP group comprising one or more coordinated APs coordinated by a coordinator AP, wherein the processing circuitry is configured to:

decode, from the coordinator AP of the EHT multi-AP group, a frame that contains synchronization information for the coordinated AP;

synchronize, based on the frame, a timing synchronization function (TSF) timer with a TSF timer of the coordinator AP; and synchronize stations (STAs) of a base station set (BSS) associated with the coordinated AP after synchronization with the coordinator AP.

2. The apparatus according to claim 1, wherein the frame is a periodic Beacon frame.

3. The apparatus according to claim 2, wherein to synchronize with the coordinator AP, the processing circuitry is configured to perform timing offset compensation and clock drift adjustment based on the Beacon frame.

4. The apparatus according to claim 3, wherein to perform timing offset compensation, the processing circuitry is configured to update a timing offset value by subtracting a Beacon frame reception time measured using the TSF timer from a value in a timestamp field in the Beacon frame.

5. The apparatus according to claim 3, wherein to perform clock drift adjustment, the processing circuitry is configured to:

calculate a clock drift amount by comparing a timing offset value obtained previously from the coordinator AP and a timing offset value obtained from the Beacon frame; and suspend the TSF timer for a duration of the clock drift amount.

6. The apparatus according to claim 1, wherein the frame is a Multi-AP Trigger frame or another control or management frame exchanged between the coordinated AP and the coordinator AP.

7. The apparatus according to claim 1, wherein the frame is a non-periodic Container frame for EHT, the Container frame having a timestamp field for synchronization, a category field to indicate one of a plurality of different management functions indicated by the Container frame, and a beacon interval that specifies a duration of a beacon interval of the BSS.

8. A non-transitory computer-readable storage medium that stores instructions for execution by processing circuitry to perform operations for communication by a coordinated access point (AP) in an extreme high throughput (EHT) multi-AP group that comprises one or more coordinated APs coordinated by a coordinator AP, the operations to configure the processing circuitry to:

receive, from the coordinator AP of the EHT multi-AP group, a synchronization frame that comprises synchronization information for the coordinated AP, the synchronization frame being one of Beacon frame, Multi-AP Trigger Frame, Container Frame, or another control or management frame exchanged between the coordinated AP and the coordinator AP; and synchronize, based on the synchronization frame, a timing synchronization function (TSF) timer with a TSF timer of the coordinator AP.

9. The non-transitory computer-readable storage medium according to claim 8, the operations to further configure the processing circuitry to:

update a timing offset value by subtracting a Beacon frame reception time measured using the TSF timer from a value in a timestamp field in the Beacon frame to perform timing offset compensation; and calculate a clock drift amount by comparing a timing offset value obtained previously from the coordinator AP and a timing offset value obtained from the Beacon frame, and suspend the TSF timer for a duration of the clock drift amount to perform clock drift adjustment.

10. An apparatus of an access point (AP), the apparatus comprising processing circuitry and memory, the processing circuitry to configure the AP to operate as a coordinator AP in an extreme high throughput (EHT) multi-AP group comprising one or more coordinated APs coordinated by the coordinator AP, wherein the processing circuitry is configured to:

communicate, via a backhaul network, with the one or more coordinated APs;

decode a physical layer conformance procedure (PLCP) protocol data unit (PPDU) received from a station (STA) on an operating channel; and encode, for transmission to the STA on the operating channel, a response to the PPDU a Short Interframe Space (SIFS) time after reception of the PPDU, the response dependent on whether frame aggregation was used to transmit the PPDU and whether other STAs have transmitted other PPDUs to the coordinator AP.

11. The apparatus according to claim 10, wherein the processing circuitry is further configured to:

encode, for transmission to the STA, a trigger frame comprising an identity of the STA and uplink transmission parameters for transmission of the PPDU by the STA.

12. The apparatus according to claim 11, wherein the trigger frame further comprises an indication whether the STA is to use frame aggregation.

13. The apparatus according to claim 10, wherein if frame aggregation was not used to transmit the PPDU, the processing circuitry is further configured to generate an acknowledgment (ACK) frame as the response, the ACK frame identical to an ACK frame sent on the operating channel to the STA from each of the coordinated APs that has received the PPDU.

14. The apparatus according to claim 10, wherein the processing circuitry is further configured to:

encode, for transmission to the STA, a trigger frame comprising an identity of the STA and uplink transmission parameters for transmission of the PPDU by the STA; and if frame aggregation was not used to transmit the PPDU and the trigger frame is addressed to multiple STAs, generate an acknowledgment (ACK) frame or null data packet (NDP) as the response, the ACK frame or NDP identical to an ACK frame or NDP sent on the operating channel to the STA from each of the coordinated APs that has received the PPDU, the ACK frame or NDP sent on the operating channel in a resource unit (RU) unique to the STA among the STAs.

15. The apparatus according to claim 10, wherein if frame aggregation was used to transmit data comprising the PPDU and at least one other PPDU, the processing circuitry is further configured to generate a block acknowledgment (BA) as a response to the data, the BA sent on the operating channel in a unique resource unit (RU) among RUs assigned to each member of the EHT multi-AP group that has received the PPDU for transmission of a response to the received PPDU.

16. The apparatus according to claim 10, wherein if frame aggregation was used to transmit data comprising the PPDU and at least one other PPDU, the processing circuitry is further configured to generate a null data packet (NDP) as the response, the NDP sent on the operating channel in a unique resource unit (RU) among RUs assigned for each of the PPDUs, the RU of the NDP for a particular PPDU of the data being the same for each of the coordinated APs that has received the particular PPDU.

17. The apparatus according to claim 10, wherein the processing circuitry is further configured to:
   decode the PPDU from each coordinated AP that has received the PPDU, the PPDU sent from the coordinated AP automatically upon reception of the PPDU.

18. The apparatus according to claim 10, wherein the processing circuitry is further configured to:
   generate, for transmission to each coordinated AP, an indication of reception of the PPDU by the coordinator AP; and
   decode, from each coordinated AP in response to transmission of the indication, an PPDU from the STA that has been received by the coordinated AP but not previously indicated as being received by the coordinator AP.

19. The apparatus according to claim 10, wherein the processing circuitry is further configured to:
   decode, from each coordinated AP, an indication of reception by the coordinated AP of PPDUs from the STA; and
   generate, for transmission to at least one of the coordinated APs, a request for PPDUs from the STA that has been indicated by the indicator as being received by the coordinated AP but has not been received by the coordinator AP.

20. The apparatus according to claim 10, wherein the processing circuitry is further configured to:
   decode the PPDU from each coordinated AP that has received the PPDU; and
   generate a delayed block acknowledgment (BA) as the response to the PPDU after decoding the PPDU from a last of the coordinated APs that has received the PPDU.

* * * * *